US010214152B1

(12) United States Patent
Bass et al.

(10) Patent No.: US 10,214,152 B1
(45) Date of Patent: Feb. 26, 2019

(54) TOOL-LESS WEDGE-TYPE ANTI-RATTLE MOUNTING SYSTEM FOR A VEHICLE-MOUNTED EQUIPMENT CARRIER

(71) Applicant: Saris Cycling Group, Inc., Madison, WI (US)

(72) Inventors: Benjamin Raymond Bass, Madison, WI (US); Ryan Weber, Madison, WI (US)

(73) Assignee: Saris Cycling Group, Inc., Madison, WI (US)

( * ) Notice: Subject to any disclaimer, the term of this patent is extended or adjusted under 35 U.S.C. 154(b) by 0 days.

(21) Appl. No.: 15/612,103

(22) Filed: Jun. 2, 2017

Related U.S. Application Data

(60) Provisional application No. 62/344,521, filed on Jun. 2, 2016.

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .................................... B60R 9/06; B60R 9/10
USPC ....................................................... 224/504
See application file for complete search history.

(56) References Cited

U.S. PATENT DOCUMENTS

| | | |
|---|---|---|
| 14,582 A | 4/1856 | Yost |
| 1,201,222 A | 10/1916 | Cadman |
| 1,255,384 A | 2/1918 | Cadam |
| 1,780,186 A | 11/1930 | Hagel |
| 1,875,969 A | 9/1932 | Weiss |
| 1,941,682 A | 1/1934 | Gurton et al. |
| 1,977,065 A | 10/1934 | Jacob |
| 2,127,912 A | 8/1938 | Graham et al. |
| 2,127,913 A | 8/1938 | Graham et al. |
| 2,133,065 A | 10/1938 | Weber |
| 2,183,990 A | 12/1939 | Dunn |
| 2,270,569 A | 1/1942 | Weiss |
| 2,295,021 A | 9/1942 | Weiss |
| 2,321,535 A | 6/1943 | Weiss |
| 2,360,335 A | 10/1944 | Fink |
| 2,370,679 A | 3/1945 | Martinelli et al. |
| 2,371,662 A | 3/1945 | Winters |
| 2,429,761 A | 10/1947 | Ketel |

(Continued)

*Primary Examiner* — Adam Waggenspack
(74) *Attorney, Agent, or Firm* — Boyle Fredrickson, S.C.

(57) ABSTRACT

A hitch-type equipment carrier for mounting to a vehicle includes a coupling member, a brace member fixed to the coupling member, and a wedge member that is movable relative to the coupling member. A manually operable actuator is positioned between the brace member and the wedge member. When the coupling member is positioned within the hitch receiver passage, operation of the actuator moves the wedge member in a first direction toward the open end of the hitch receiver passage. The wedge member moves outwardly upon advancement through the open end of the hitch receiver passage. Such transverse movement of the wedge member brings the wedge member into contact with one or more walls of the hitch receiver, which forces the coupling member against one or more of almost walls of the hitch receiver for preventing rattle of the coupling member within the passage of the hitch receiver.

20 Claims, 3 Drawing Sheets

(56) References Cited

U.S. PATENT DOCUMENTS

| | | |
|---|---|---|
| 2,448,744 A | 9/1948 | Strader |
| 2,515,856 A | 7/1950 | Brougher |
| 2,522,791 A | 9/1950 | Ketel |
| 2,763,498 A | 9/1956 | Vaugoyeau |
| 2,793,770 A | 5/1957 | St. Denis |
| 2,817,537 A | 12/1957 | Atkinson |
| 2,887,325 A | 5/1959 | Warren |
| 2,984,502 A | 5/1961 | Tyrrell |
| 2,998,268 A | 8/1961 | Witter |
| 3,018,118 A | 1/1962 | Raidel |
| 3,052,487 A | 9/1962 | Harbers et al. |
| 3,531,141 A | 9/1970 | Dalton |
| 3,630,321 A | 12/1971 | Hollnagel |
| 3,734,541 A | 5/1973 | Burroughs |
| 3,944,243 A | 3/1976 | Yates |
| 4,008,905 A | 2/1977 | Soteropulos et al. |
| 4,029,333 A | 6/1977 | Christensen |
| 4,139,245 A | 2/1979 | McCloskey |
| 4,298,212 A | 11/1981 | Jamison |
| 4,428,595 A | 1/1984 | Martin et al. |
| 4,474,689 A | 10/1984 | Bird et al. |
| 4,509,770 A | 4/1985 | Young et al. |
| 4,629,207 A | 12/1986 | Shiflet |
| 5,078,418 A | 1/1992 | Kalmanson |
| 5,181,822 A | 1/1993 | Allsop et al. |
| 5,186,483 A | 2/1993 | Sheppard |
| 5,333,888 A | 8/1994 | Ball |
| 5,344,175 A | 9/1994 | Speer |
| 5,394,948 A | 3/1995 | Bunnell |
| 5,449,101 A | 9/1995 | Van Dusen |
| 5,593,172 A | 1/1997 | Breslin |
| 5,615,904 A | 4/1997 | Van Dusen et al. |
| 5,671,938 A | 9/1997 | Olson |
| 5,685,686 A | 11/1997 | Burns |
| 5,690,260 A * | 11/1997 | Aikins ............ B60R 9/06 224/504 |
| 5,735,539 A | 4/1998 | Kravitz |
| 5,988,667 A | 11/1999 | Young |
| 6,010,143 A | 1/2000 | Stein |
| 6,010,144 A | 1/2000 | Breslin |
| 6,105,989 A | 8/2000 | Linger |
| 6,131,938 A | 10/2000 | Speer |
| 6,142,502 A | 11/2000 | Breslin |
| 6,186,531 B1 | 2/2001 | Parent |
| 6,241,271 B1 | 6/2001 | Belinky |
| 6,334,561 B1 | 1/2002 | Cole |
| 6,336,580 B1 | 1/2002 | Allen et al. |
| 6,357,780 B1 | 3/2002 | Young |
| 6,382,656 B1 | 5/2002 | Johnson, Jr. |
| 6,406,051 B1 | 6/2002 | Phillips |
| 6,409,203 B1 | 6/2002 | Williams |
| 6,609,725 B1 | 8/2003 | Williams |
| 6,672,115 B2 | 1/2004 | Wyers |
| 6,688,804 B1 | 2/2004 | Parent |
| 6,733,029 B2 | 5/2004 | McCoy et al. |
| 6,834,879 B1 | 12/2004 | Lorman |
| 6,835,021 B1 | 12/2004 | McMillan |
| 6,945,550 B2 | 9/2005 | Williams |
| 6,951,287 B1 | 10/2005 | Randazzo |
| 6,974,147 B1 * | 12/2005 | Kolda ............ B60D 1/52 280/506 |
| 8,262,121 B2 * | 9/2012 | Beck ............ B60D 1/52 280/491.2 |
| 2002/0145270 A1 | 10/2002 | Williams |
| 2004/0104558 A1 | 6/2004 | Williams |
| 2004/0262883 A1 | 12/2004 | Kerins et al. |

* cited by examiner

TOOL-LESS WEDGE-TYPE ANTI-RATTLE MOUNTING SYSTEM FOR A VEHICLE-MOUNTED EQUIPMENT CARRIER

CROSS-REFERENCE TO RELATED APPLICATION

This patent application claims the benefit of U.S. provisional patent application Ser. No. 62/344,521 filed Jun. 2, 2016, the entire contents of which are hereby expressly incorporated by reference.

BACKGROUND AND SUMMARY

This invention relates to vehicle-mounted equipment carriers, such as, but not limited to, carriers for transporting bicycles or other recreational equipment on a vehicle, and more particularly to a wedge-type anti-rattle mounting system for a hitch-mounted equipment carrier.

Many vehicle-mounted equipment carriers or racks, such as bicycle racks, are adapted for mounting to an existing hitch receiver on the back of an automobile or truck. A hitch receiver typically includes a square tube, welded to the frame of the vehicle under the rear bumper, with a passage having an open end for receiving a mating coupling on a trailer. The square tube typically has a pair of, or a series of pairs of, aligned holes on opposite sides which allow a locking pin to be inserted transversely to the hitch receiver for securing a trailer hitch to the hitch receiver.

A hitch-mounted bicycle rack is adapted for mounting to such a hitch receiver by means of a coupling bar or tube which is inserted into the open end of the hitch receiver and is retained within the passage of the hitch receiver by a conventional locking pin. A problem with hitch rack designs of this type is that the coupling bar or tube does fit closely inside the passage of the hitch receiver, and slight movements or rattling of the coupling bar or tube result in significant and noticeable wobble at the upper end of the carrier frame which supports the bicycles. As a result, the bicycles are subjected to unnecessary and potentially damaging vibration and rattling.

Many prior art designs have been developed to address this problem. Such designs typically require use of a tool such as a wrench for tightening a bolt or nut that, e.g., draws the coupling bar tight against a wall of the hitch receiver or advances a shim to wedge the coupling bar against the wall of the hitch receiver. While designs of this type function to eliminate rattle between the coupling bar and the hitch receiver, they are disadvantageous in their requirement for a tool that must be used to install and remove the rack. In use, the tool can be misplaced or lost, which can cause a frustrating delay when mounting and/or removing the rack.

What is needed is a hitch mounting system for bicycle hitch racks which can eliminate substantially all wobble and shaking of the rack on the transport vehicle during normal travel, and which does not involve the use of tools for mounting and removal of the rack to and from the hitch receiver.

In accordance with one aspect of the present invention, an equipment carrier for mounting to a vehicle, which includes a hitch receiver having a series of walls that define a passage having an open end, includes a coupling member, which extends along a longitudinal axis, carried by the equipment carrier and configured to be inserted through the open end and into the hitch receiver passage. A brace member is fixed to the coupling member, and is located exteriorly of the hitch receiver passage and spaced from the open end of the hitch receiver passage. A wedge member is movable relative to the coupling member along a path of movement that is generally parallel to the longitudinal axis of the coupling member. A manually operable actuator is positioned between the brace member and the wedge member. When the coupling member is positioned within the hitch receiver passage, operation of the actuator moves the wedge member in a first direction along the path of movement toward the open end of the hitch receiver passage and in a second direction along the path of movement away from the open end of the hitch receiver passage. The wedge member is configured so as to move in a direction transverse to the longitudinal advancement of the wedge member upon advancement in the first direction through the open end of the hitch receiver passage. Such transverse movement of the wedge member brings the wedge member into contact with one or more walls of the hitch receiver, which forces the coupling member against one or more of almost walls of the hitch receiver for preventing rattle of the coupling member within the passage of the hitch receiver. A positioning arrangement, such as a cross-pin, may be employed to fix the axial position of the coupling member relative to the hitch receiver passage.

The brace member may be in the form of a mounting bracket secured to the coupling member, and a lower end of a frame of the equipment carrier may be secured to the mounting bracket.

The coupling member may include a guide recess that defines the path of movement of the wedge member relative to the coupling member. The guide recess may be located at a corner defined by the coupling member. The guide recess and wedge member may be configured such that advancement of the wedge member in the first direction through the open end of the hitch receiver passage causes outward movement of the wedge member at the corner defined by the coupling member and into engagement with a corner defined by the hitch receiver, so as to force one or more surfaces of the coupling member opposite the corner of the coupling member against one or more surfaces of the hitch receiver opposite the corner of the hitch receiver.

The manually operable actuator may be in the form of a selectively extendible and retractable actuator assembly connected between the wedge member and the brace member. The actuator assembly may include a first end secured to the brace member, a second end secured to the wedge member, and a variable length actuator member between the first and second ends. The variable length actuator member may be in the form of a threaded rod and a manually operable rotatable threaded actuator engaged with the threaded rod, such that rotation of the threaded actuator causes axial movement of the threaded rod relative to the threaded actuator for selectively varying the length of the actuator member between the first and second ends.

The present invention also contemplates a method of securing an equipment carrier to a vehicle, substantially in accordance with the foregoing summary.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and invention includes all such modifications.

BRIEF DESCRIPTION OF THE DRAWINGS

A clear conception of the advantages and features constituting the present invention, and that the construction and operation of typical mechanisms provided with the present invention, will become more readily apparent by referring to be exemplary, and therefore non-limiting, embodiments illustrated in the drawings accompanying and forming a part of this specification, wherein like reference numerals designate the same elements can be several views, and in which.

Figure 1:
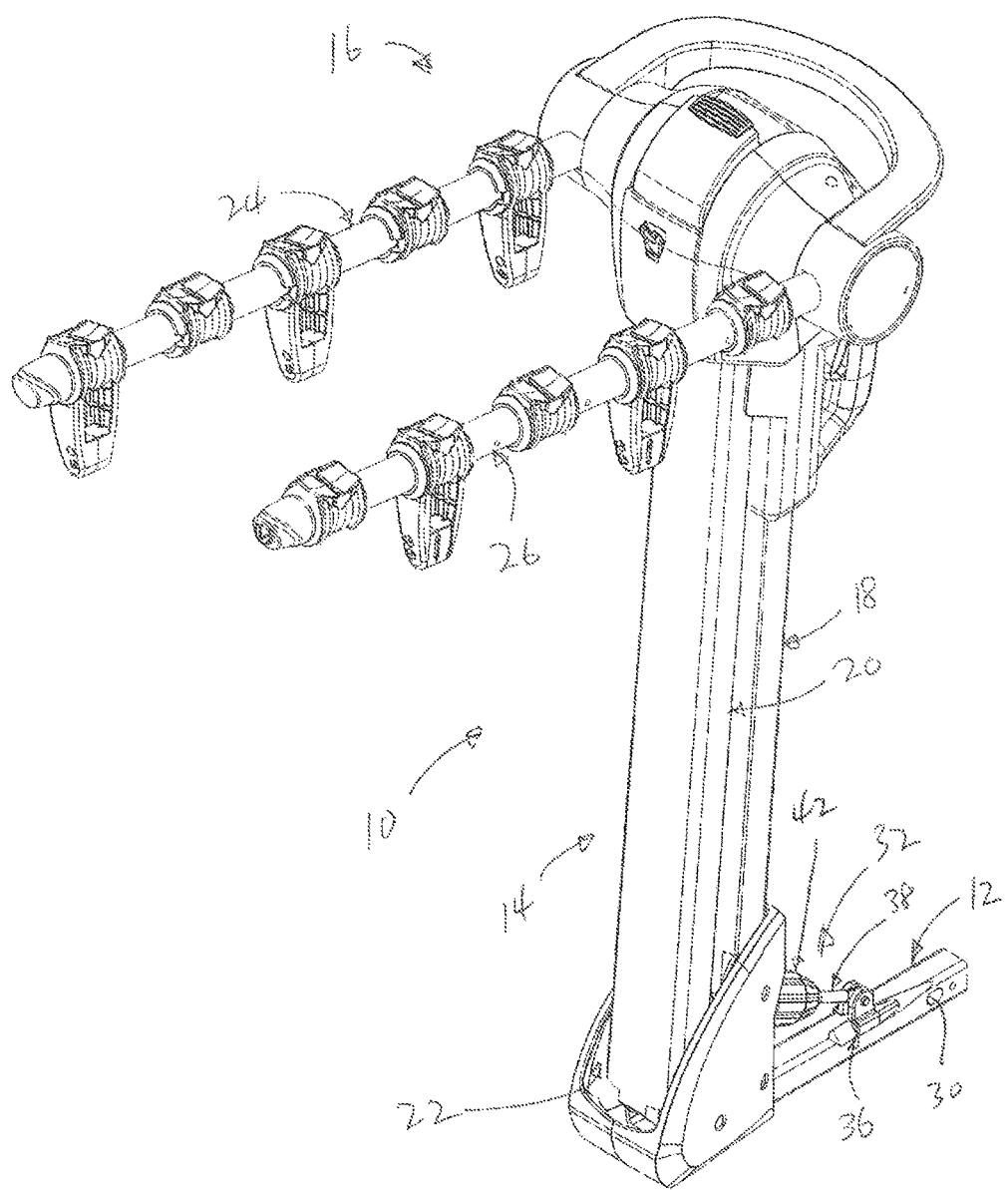
FIG. 1 is an isometric view illustrating an equipment carrier, in the form of a bicycle rack, incorporating the mounting system of the present invention.
Figure 2:
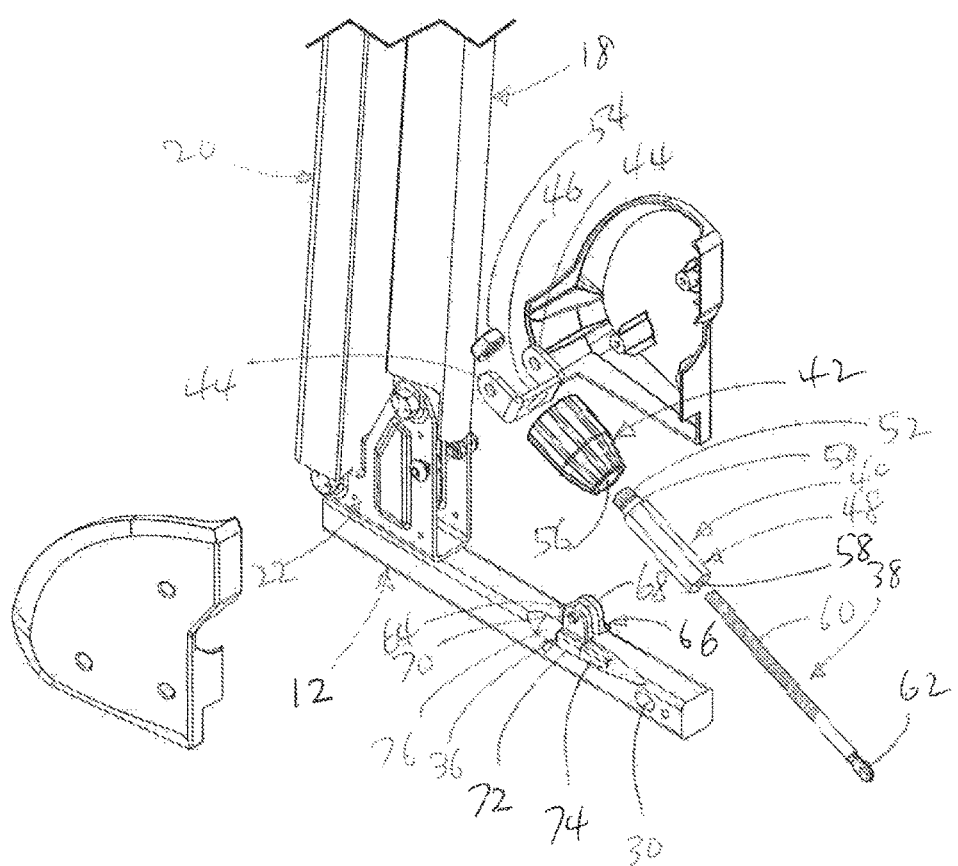
FIG. 2 is a partial exploded isometric view illustrating the components of the mounting system of FIG. 1.

In describing the embodiment of the invention which is illustrated in the drawings, specific terminology will be resorted to for the sake of clarity. However, it is not intended that the invention be limited to be specific terms so selected and is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The various features and advantageous details of the subject matter disclosed herein are explained more fully with reference to the non-limiting embodiments described in detail in the following description.

FIG. 1 illustrates an equipment carrier, generally designated at 10, which is configured for mounting to the rear of a vehicle. Equipment carrier 10 is shown as a bicycle rack or carrier, although it is understood that the present invention may be employed with any type of vehicle-mounted equipment carrier or rack. Generally, equipment carrier 10 includes a mounting member 12, a mast shown generally at 14, and an equipment support arrangement shown generally at 16. In the illustrated embodiment, the mast 14 includes a front mast member 18 and a rear mast member 20, which are pivotably mounted at their lower ends to a lower mounting bracket 22. The equipment support arrangement 16 includes a pair of spaced apart equipment-supporting arms 24, 26, which as noted above are configured in the illustrated embodiment for supporting a number of bicycles. Again, as noted previously, the equipment support arrangement may have any other configuration as desired and may be configured for carrying or supporting any type of equipment, also as desired.

While the specific configuration of the mast 14 and equipment support arrangement 16 form no part of the present invention, an explanation of the construction and operation of the mast 14 and equipment support arrangement 16 can be found in co-pending application Ser. No. 15/611,485, filed Jun. 1, 2017, the entire contents of which are hereby incorporated by reference.

Figure 3:
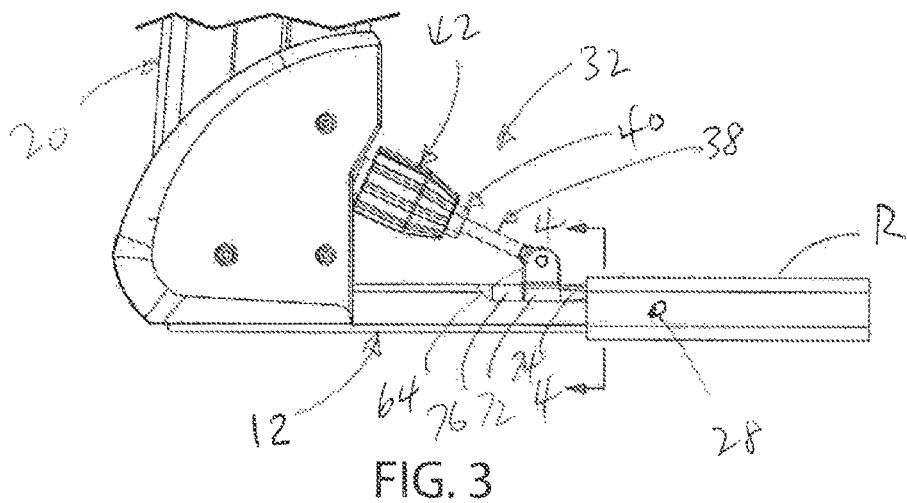
FIG. 3 is a side elevation view illustrating the mounting system of FIGS. 1 and 2.
Figure 4:
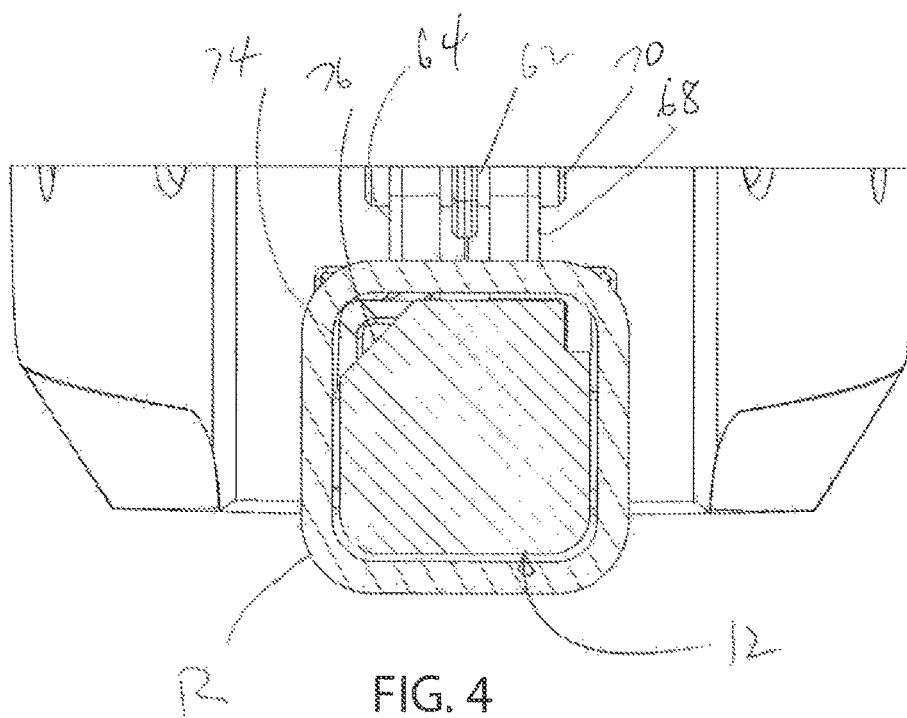
FIG. 4 is a section view taken along line 4-4 of FIG. 3.

In a manner as is known, the mounting member 12 is in the form of a mounting bar that is configured and sized so as to fit within a rearwardly open passage of a vehicle hitch receiver R, as shown in FIG. 3. In a manner as is known, the hitch receiver R has a tubular configuration and includes a pair of spaced-apart sidewalls within which aligned openings, one of which is shown at 28, are formed. The mounting member 12 includes a transverse passage 30, which is adapted to be positioned between the openings 28 when mounting member 12 is inserted into the passage of the hitch receiver R. A hitch pin is adapted to be inserted through the openings 28 and mounting member passage 30, in a manner as is known, for fixing the axial position of the mounting member 12 within the passage of the hitch receiver R.

An anti-rattle or tightening system 32 in accordance with the present invention is provided for preventing wobble or rattle of mounting member 12 within the passage of hitch receiver R. Generally, tightening system 32 includes a mounting bracket 34, a wedge member 36, an actuator shaft 38, an actuator member 40, and a knob 42.

The lower mounting bracket 22 is rigidly fixed toward the rearward end of mounting member 12, and the mounting bracket 34 of tightening system 32 is secured to the lower mounting bracket 22. While lower mounting bracket 22 is utilized in the illustrated embodiment, it should be understood that the tightening system mounting bracket 34 may be secured to any structure that is secured in a fixed position relative to mounting member 12. In this embodiment, lower mounting bracket 22 defines a pair of spaced-apart walls, and tightening system mounting bracket 34 defines a pair of side tabs 44, each of which is located adjacent one of the walls of lower mounting bracket 22. Each side tab 44 is pivotably mounted to one of the walls of lower mounting bracket 22, such as via a suitable fasteners, so that tightening system mounting bracket 34 can pivot relative to lower mounting bracket 22.

Actuator member 40 is rotatably secured relative to tightening system mounting bracket 34. In the illustrated embodiment, tightening system mounting bracket 34 includes a center wall 46 between side tabs 42, which is provided with an opening. Actuator member 40 is formed with a body portion 48, a neck 50 that extends from one end of body portion 48, and a threaded end 52 that extends from neck 50. The neck 50 is configured to be received within the opening formed in center wall 46, and a nut 54 is engaged with the threaded end 52 to secure actuator member 40 to bracket 34. With neck 50 residing within the opening of bracket center wall 46, actuator member 40 can the rotated relative to bracket 34.

The exterior of actuator member body portion 48 has an irregular cross-section. In the illustrated embodiment, the cross-section of body portion 48 is generally hexagonal, although it is understood that body portion 48 may have any non-circular cross-section. Knob 42 defines an axial passage 56 configured to receive body portion 48 of actuator member 40. Again, in the illustrated embodiment, the axial passage 56 of knob 42 is hexagonal and receives body portion 48 of actuator member 40 therewithin so that knob 42 and actuator member 40 are non-rotatably secured together. In this manner, a user may manually engage the external surface of knob 42 so as to impart rotation to actuator member 40 relative to bracket 34.

Body portion 48 of actuator member 40 also includes a passage 58 that extends inwardly from its end opposite that of threaded end 52. Actuator shaft 38 defines a threaded portion 60 that is threadedly received within the threaded passage 50 of actuator member body portion 48. At its end opposite threaded end 60, actuator shaft 38 includes an eye 62 within which an opening is formed.

Wedge member 36 is provided with a mounting boss 64 that is located above the top surface of mounting member 12. Similarly, a guide member 66, which is located adjacent a side of mounting member 12 opposite that of wedge member 36, includes a mounting boss 68 located above the top surface of mounting member 12. The mounting bosses 64, 68 are spaced apart from each other, and the eye 62 of actuator shaft 38 is positioned between mounting bosses 64, 68. A pin 70 extends through the openings of mounting bosses 64, 68 and through the opening of eye 62, so as to pivotably mount the outer end of actuator shaft 38 to and between mounting bosses 64, 66.

Wedge member 36 includes a body portion 72 and a leading wedge portion 74. The body portion 72 and leading wedge portion 74 are disposed within a recess 76 that is provided in mounting member 12. Recess 76 is formed at a corner of mounting member 12, extending between the top surface of mounting member 12 and one of its side surfaces. Body portion 72 is generally formed in a configuration that is complementary to a rear area of recess 76, so that body portion 72 generally occupies the missing portion of the rectangular cross-section of mounting member 12 that is created by the rear portion of recess 76.

The recess 76 includes a tapered front end portion. Likewise, the leading wedge portion 74 of wedge member 36 has a tapered front configuration that is complementary to the front portion of recess 76.

In operation, the user first inserts the forward end of mounting member 12 into the passage of hitch receiver R and then fixes the axial position of mounting member 12 relative to hitch receiver R. Representatively, this can be accomplished by inserting a hitch pin through hitch receiver openings 28 and mounting member passage 30, as described previously, and as is well known. Tightening system 32 is initially positioned rearwardly within recess 76 so as to enable mounting member 12 to be fully inserted within hitch receiver R without interference. Using knob 42, the user then rotates actuator member 40 in a manner that moves actuator shaft 38 outwardly relative to mounting member 40 due to the threaded connection between actuator shaft 30 and actuator member 40. Such outward movement of actuator shaft 38 simultaneously causes forward movement of wedge member 36 within recess 76 and slight pivoting movement of mounting bracket 34 at its pivot connection with mounting bracket 22. As the user continues to rotate actuator member 40 in this manner and extends actuator shaft 38, leading wedge portion 74 of wedge member 36 comes into contact with the tapered forward portion of recess 76, which moves leading wedge portion 74 outwardly. Such outward movement of leading wedge portion 74 causes it to come into contact with the top inner surface and one of the side inner surfaces of the hitch receiver R at the corner defined by such surfaces. Continued advancement of wedge member 36 in this manner causes further outward movement of leading wedge portion 74, forcing the opposite side surface of mounting member 12 and the bottom surface of mounting member 12 against the opposite inner side surface and the bottom inner surface, respectively, of hitch receiver R. This outward wedging movement of leading wedge portion 74 during axial advancement of wedge member 36 caused by actuator shaft 38 and actuator member 40 thus functions to tightly wedge the surfaces of mounting member 12 against the inside surfaces of hitch receiver R to prevent wobble or rattle of mounting member 12. It can thus be appreciated that this is accomplished simply by manual operation by a user in rotating knob 42 and causing rotation of actuator member 40, without the use of tools. When it is desired to remove the mounting member 12 from the hitch receiver R, the user simply reverses the above steps to move wedge member 36 rearwardly within recess 76 and to thereby move leading wedge portion 74 of wedge member 36 inwardly by movement along the forward portion of recess 76 in a rearward direction.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An equipment carrier arrangement for a vehicle, comprising:
    a hitch receiver carried by the vehicle, wherein the hitch receiver has a series of walls that define a hitch receiver passage having an open end, wherein the hitch receiver passage extends along a longitudinal axis; and
    an equipment carrier, comprising:
        a coupling member carried by the equipment carrier and configured to be inserted through the open end of the hitch receiver passage and into the hitch receiver passage, wherein the coupling member extends along a longitudinal axis;
        a brace member fixed relative to the coupling member, wherein the brace member is located exteriorly of the coupling member and the hitch receiver when the coupling member is positioned within the hitch receiver passage and is spaced from the open end of the hitch receiver passage and offset from the longitudinal axis of the coupling member;
        a wedge member that is movable along an exterior defined by the coupling member; and
        a manually operable actuator positioned exteriorly of the hitch receiver and the coupling member and connected to the brace member and the wedge member exteriorly of the hitch receiver and the coupling member, wherein, when the coupling member is positioned within the hitch receiver passage, operation of the actuator moves the wedge member in a first direction along the exterior of the coupling member toward and into the open end of the hitch receiver passage and in a second direction along the exterior of the coupling member away from the open end of the hitch receiver passage, wherein the wedge member is configured so as to move in a direction transverse to the longitudinal advancement of the wedge member upon advancement in the first direction through the open end of the hitch receiver passage and into engagement with one or more of the hitch receiver walls.

2. The equipment carrier of claim 1, further comprising a positioning arrangement for fixing the axial position of the coupling member relative to the hitch receiver passage.

3. The equipment carrier of claim 2, wherein the positioning arrangement comprises a cross pin that extends through aligned openings in a pair of walls of the hitch receiver and through a transverse passage of the coupling member that is positioned between and aligned with the aligned openings of the pair of hitch receiver walls.

4. The equipment carrier of claim 1, wherein the brace member comprises a mounting bracket secured to the coupling member and wherein a lower end of a frame of the equipment carrier is secured to the mounting bracket.

5. The equipment carrier of claim 1, wherein the coupling member includes a guide recess that defines the path of movement of the wedge member relative to the coupling member.

6. The equipment carrier of claim 5, wherein the guide recess is located at a corner defined by the coupling member, and wherein the guide recess and wedge member are configured such that advancement of the wedge member in the first direction through the open end of the hitch receiver passage causes outward movement of the wedge member at the corner defined by the coupling member and into engagement with a corner defined by the hitch receiver and is operable to force one or more surfaces of the coupling member opposite the corner of the coupling member against one or more surfaces of the hitch receiver opposite the corner of the hitch receiver.

7. The equipment carrier of claim 1, wherein the manually operable actuator comprises a selectively extendible and retractable actuator assembly connected between the wedge member and the brace member.

8. The equipment carrier of claim 7, wherein the selectively extendible and retractable actuator assembly includes a first end secured to the brace member, a second end secured to the wedge member, and a variable length actuator member between the first and second ends.

9. The equipment carrier of claim 8, wherein the variable length actuator member comprises a threaded rod and a manually operable rotatable threaded actuator engaged with the threaded rod, wherein rotation of the threaded actuator causes axial movement of the threaded rod relative to the threaded actuator for selectively varying the length of the actuator member between the first and second ends.

10. An equipment carrier arrangement for a vehicle, comprising:
a hitch receiver carried by the vehicle, wherein the hitch receiver has a series of walls that define a hitch receiver passage having an open end and that extends along a longitudinal axis; and
an equipment carrier, comprising:
a coupling member carried by the equipment carrier and extending along a longitudinal axis, wherein the coupling member is configured to be inserted through the open end of the hitch receiver passage and into the hitch receiver passage, and wherein the coupling member has an exterior that includes a guide recess extending along the longitudinal axis;
a brace member fixed relative to the coupling member, wherein the brace member is located exteriorly of the hitch receiver and the coupling member when the coupling member is positioned within the hitch receiver passage and is spaced from the open end of the hitch receiver passage and offset from the longitudinal axis of the coupling member;
a wedge member movably mounted within the guide recess of the coupling member; and
a variable length manually operable actuator assembly positioned exteriorly of the hitch receiver and the coupling member and connected to the brace member and the wedge member exteriorly of the hitch receiver and the coupling member, wherein the actuator assembly defines a first end pivotably secured to the brace member and a second end pivotably secured to the wedge member, and wherein the manually operable actuator assembly includes a threaded rod and a manually operable rotatable threaded actuator engaged with the threaded rod, wherein rotation of the threaded actuator causes axial movement of the threaded rod relative to the threaded actuator for selectively varying the length of the actuator member between the first and second ends, wherein, when the coupling member is positioned within the hitch receiver passage, rotation of the threaded actuator causes movement of the wedge member in a first direction within the guide recess along the exterior of the coupling member and into the hitch receiver passage and in a second direction along the exterior of the coupling member away from the hitch receiver passage, wherein the wedge member and the guide recess are configured so as to move the wedge member in a direction transverse to the longitudinal axis of the coupling member into engagement with one or more walls of the hitch receiver when the coupling member is positioned within the hitch receiver passage and the threaded actuator is rotated to move the wedge member in the first direction.

11. The equipment carrier of claim 10, wherein the guide recess is located at a corner defined by the coupling member, and wherein the guide recess and wedge member are configured such that advancement of the wedge member in the first direction through the open end of the hitch receiver passage causes outward movement of the wedge member at the corner defined by the coupling member and into engagement with a corner defined by the walls of the hitch receiver and is operable to force one or more surfaces of the coupling member opposite the corner of the coupling member against one or more surfaces of the hitch receiver opposite the corner of the hitch receiver.

12. The equipment carrier of claim 10, further comprising a cross pin that extends through aligned openings in a pair of walls of the hitch receiver and through a transverse passage of the coupling member that is positioned between and aligned with the aligned openings of the pair of hitch receiver walls for fixing the axial position of the coupling member within the hitch receiver passage.

13. A method of securing an equipment carrier to a vehicle, wherein the vehicle includes a hitch receiver having a series of walls that define a hitch receiver passage having an open end, comprising the acts of:
inserting a coupling member of the equipment carrier through the open end and into the hitch receiver passage, wherein the coupling member extends along a longitudinal axis and includes a brace member located exteriorly of the hitch receiver passage and spaced from the open end of the hitch receiver passage when the coupling member is inserted into the hitch receiver passage, wherein the brace member is offset from the longitudinal axis of the coupling member, and wherein the coupling member further includes a wedge member that is movable along an exterior defined by the coupling member; and
manually operating an actuator positioned exteriorly of the hitch receiver and the coupling member and connected to the brace member and the wedge member exteriorly of the hitch receiver and the coupling member, wherein when the coupling member is positioned within the hitch receiver passage, operation of the actuator moves the wedge member in a first direction along the exterior of the coupling member toward and into the open end of the hitch receiver passage and in a second direction along the exterior of the coupling member away from the open end of the hitch receiver passage, wherein the wedge member is configured so as to move in a direction transverse to the longitudinal axis upon advancement of the wedge member in the first direction through the open end of the hitch receiver passage and into engagement with one or more of the hitch receiver walls.

14. The method of claim 13, further comprising the act of fixing the axial position of the coupling member relative to the hitch receiver passage.

15. The method of claim 14, wherein the act of fixing the axial position of the coupling member relative to the hitch receiver passage is carried out by inserting a cross pin through aligned openings in a pair of walls of the hitch receiver and through a transverse passage of the coupling member that is positioned between and aligned with the aligned openings of the pair of hitch receiver walls.

16. The method of claim 13, wherein the wedge member moves along the coupling member by moving the wedge member within a guide recess in the coupling member that defines a path of movement of the wedge member relative to the coupling member.

17. The method of claim 16, wherein the guide recess is located at a corner defined by the coupling member, and wherein the guide recess and wedge member are configured such that advancement of the wedge member in the first direction through the open end of the hitch receiver passage causes outward movement of the wedge member at the corner defined by the coupling member and into engagement with a corner defined by the hitch receiver walls and is operable to force one or more surfaces of the coupling member opposite the corner of the coupling member against one or more surfaces of the hitch receiver walls opposite the corner of the hitch receiver.

18. The method of claim 13, wherein the act of manually operating the actuator comprises selectively extending and retracting an actuator assembly connected between the wedge member and the brace member.

19. The method of claim 18, wherein the act of selectively extending and retracting the actuator assembly is carried out via a variable length actuator member.

20. The method of claim 19, wherein the act of manually operating the actuator is carried out using a threaded rod and a manually operable rotatable threaded actuator engaged with the threaded rod, wherein rotation of the threaded actuator causes axial movement of the threaded rod relative to the threaded actuator for selectively varying the length of the actuator member between the first and second ends.

* * * * *